March 6, 1973 T. F. McGRAW 3,718,992

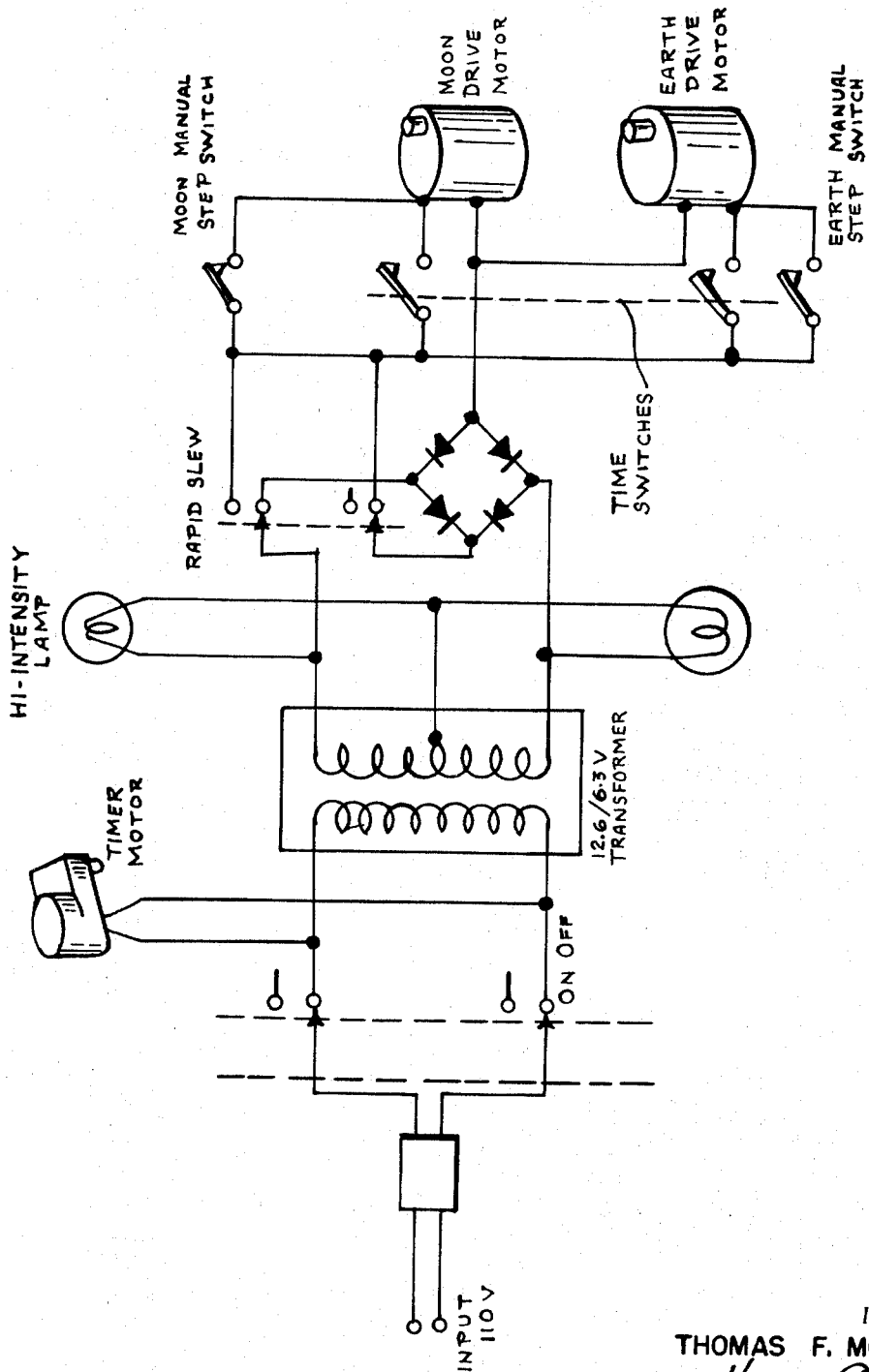

SELF-CONTAINED PLANETARIUM

Filed May 11, 1971 2 Sheets-Sheet 1

INVENTOR.
THOMAS F. MC GRAW
BY Harry A. Herbert Jr
Jacob N. Erlich and
ATTORNEYS

United States Patent Office 3,718,992
Patented Mar. 6, 1973

3,718,992
SELF-CONTAINED PLANETARIUM
Thomas F. McGraw, 808 Felbar Ave.,
Torrance, Calif. 90503
Filed May 11, 1971, Ser. No. 142,146
Int. Cl. G09b 27/06
U.S. Cl. 35—42.5                    6 Claims

ABSTRACT OF THE DISCLOSURE

The self-contained planetarium provides a graphic, basic representation of the star canopy and moon's motion over the earth's surface. This planetarium has a rotating outer globe representing the earth and a stationary inner sphere. The sphere has perforations therein representing the relative position of the stars in the heaven as well as a perforation utilized in projecting the moon's image to the surface of the globe. Thus, it is possible at a glance to view the star cover and the moon anywhere in the world.

BACKGROUND OF THE INVENTION

This invention relates generally to planetariums and, more particularly, to a self-contained planetarium which needs no specially curved projection surface or room for operation thereof.

In many instances, it becomes necessary to provide a graphic, basic representation of the star canopy over most of the earth's surface and a ground path illustration of the moon's motion over this surface. For example, a device capable of producing such a representation could be utilized as an educational training aid, a planning aid, and possibly a navigational aid. Heretofore, such a device was in the form of a planetarium. This planetarium essentially is in the form of a multiple slide projector producing more than 100 separate images on an interior spherical projector screen or dome. At the opposite ends of a typical projection instrument are two large balls, each of which contain 16 projectors. These project onto the dome overhead 32 pictures which combine to form a representation of the principal stars in both hemispheres.

Motors provide motion for the planetarium. One set turns the instrument to simulate the daily rotation of the earth while another set produces angular motion of the sun, moon and planets forward or back in time. Motion around a horizontal axis gives the effect of a change of latitude. These planetariums, although extremely accurate in their presentation of the star canopy, are of such large size that in many instances their utilization becomes impossible. Furthermore, their great manufacturing expense limits their use to situations only wherein such an expenditure is warranted. It has been a continuing problem to construct a device capable of providing the basic representations of the star canopy while being of a limited size and capable of being produced economically.

SUMMARY OF THE INVENTION

The instant invention sets forth a self-contained planetarium which is capable of providing this graphic, basic representation of the star canopy as well as a ground path illustration of the moon motion. The self-contained planetarium of this invention is made up of a translucent earth-globe which is driven by a small motor in order to simulate the real time rotation of the earth. Inside this globe is a hollow plastic sphere, perforated in the same order as the celestial sphere. The plastic sphere is fixed, with its equator approximating that of the celestial equator. A low voltage, high-intensity light bulb is located at the center of the sphere and projects the image of the star pattern to the surface of the translucent earth globe. A timing motor connected to a small mirror is located beneath the internal sphere in order to reflect an image of the moon to the surface of the globe. Thus, by observing one's location on the globe it is possible to view the star cover and the moon, whether overhead or anywhere in the world.

This self-contained planetarium can realistically and dynamically simulate virtually any situation of the earth-moon-star relationship. It is capable of not only illustrating overhead conditions, but also accurate representation of conditions elsewhere in the world simultaneously.

It is therefore an object of this invention to provide a self-contained planetarium which is capable of producing a realistic representation of the earth-moon-star relationship and their relative movement with one another.

It is another object of this invention to provide a self-contained planetarium which is capable of operating at normal or other various operating speeds.

It is a further object of this invention to provide a self-contained planetarium which is extremely compact and which is economical to produce and utilizes conventional, currently available components that lend themselves to standard mass-producing manufacturing techniques.

For a better understanding of the present invention together with other and further objects thereof, reference is made to the following description taken in connection with the accompanying drawing and its scope will be pointed out in the appended claims.

DESCRIPTION OF THE DRAWINGS

FIG. 2 is a schematic drawing of the electrical circuitry which permits operation and rapid slewing of the self-contained planetarium of this invention.

DETAILED DESCRIPTION OF THE PREFERRED EMBODIMENT

Figure 1:
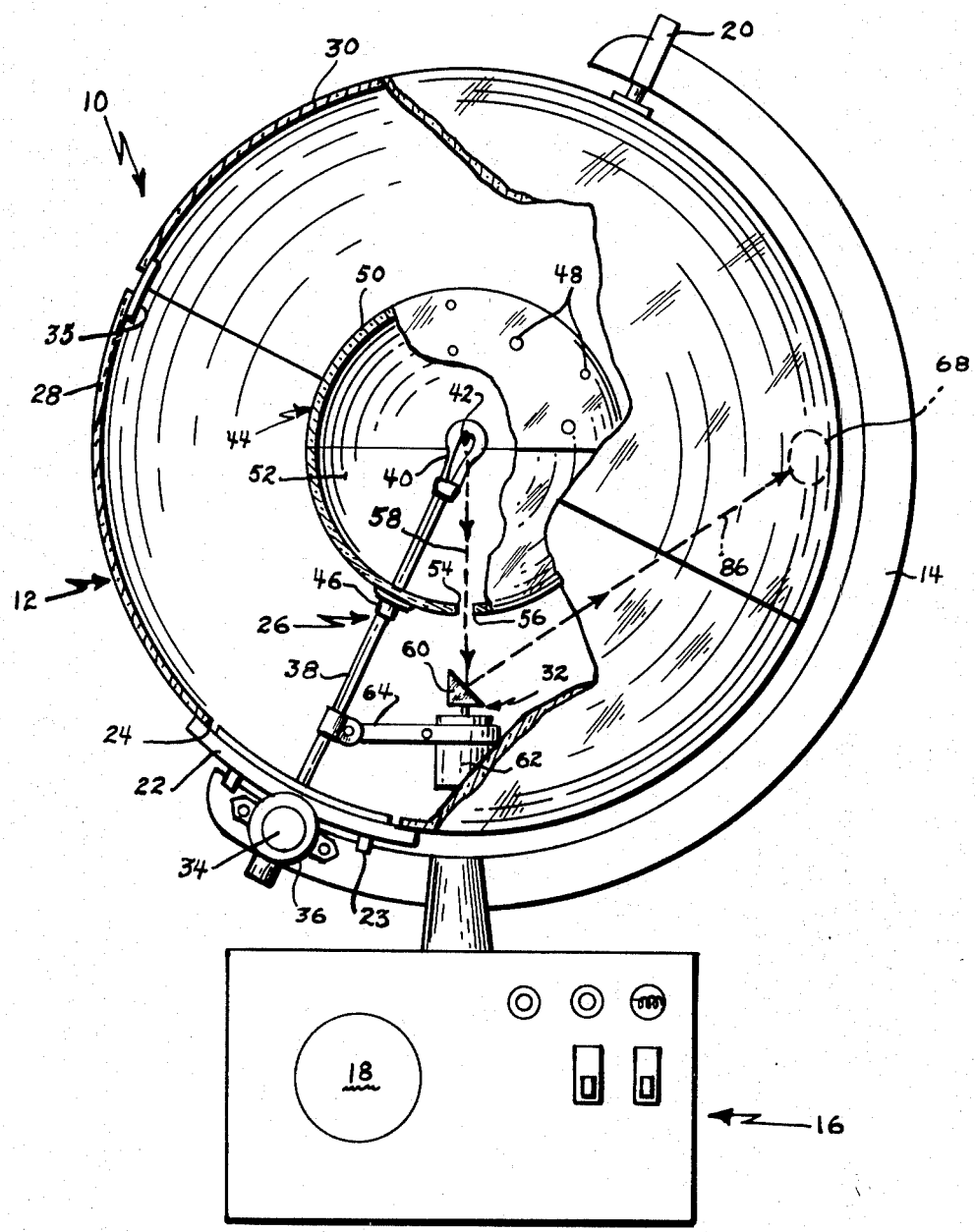
FIG. 1 is a side elevational view shown partly in cross-section of the self-contained planetarium of this invention.

Reference is now made to FIG. 1 of the drawing which shows in pictorial fashion the self-contained planetarium 10 of this invention. This planetarium 10 is made up of a globe 12 manufactured from any commercially made translucent globe of the internally lighted variety and represents the earth onto which the star and moon pattern is projected. In this instance the globe 12 is a replica of the earth; however, it is to be noted that the globe 12 may take the form of any other planet or the like. The globe 12 is mounted for rotation about its axis on a meridian arc 14 which, in turn, is mounted on a box-like base structure 16 which contains an "on-off" switch 18, a mechanized timing circuit 19 (shown in FIG. 2), and a transformer for the light source.

As shown in FIG. 1, the globe 12 is held in a rotatable position by a locking screw 20 and rests on a globe bearing disk 22. The bearing disk 22 is fixedly secured by any conventional securing arrangement, such as clamps 23 to the meridian arc 14, and the globe rotates freely about it. The globe 12 has an opening 24 at the bottom thereof so that the globe 12 can be inserted over a projector mechanism 26 when positioned upon bearing disk 22. Furthermore, it is necesary for the globe 12 to be formed of two halves 28 and 30 in order to mount the reflector mechanism 32 and inner sphere 44 within the globe 12 in a manner to be described in detail hereinbelow. Any suitable fastening means, such as small plastic tabs 35, are utilized to hold the halves 28 and 30 of globe 12 in place once the globe 12 is in position over the sphere 44 and reflector mechanism 32.

The globe 12 is rotated in a realistic fashion about its axis by means of a small stepping motor 34 secured to meridian arc 14 in conjunction with any suitable drive means such as rubber tire drive 36 or gear arrangement (not shown). This motor 34 is mounted on any suitable bracket fixed to the meridian arc 14 of the planetarium 10. The drive wheel 36 is a measured distance from the axis of the earth-globe 12 for fine adjustments to the rotation rate. The globe 12 has one end thereof resting lightly on the drive wheel 36 for a positive driving action and is supported for rotational movement at the other end by the locking screw 20.

Inside the earth-globe 12 one end of a hollow shaft 38 is fixedly secured through bearing disk 22 on the globe's axis to the meridian arc 14. This insures the correct location of disk 22 and thereby the proper rotation of the globe 12 when driven by the motor 34. Any conventional high-intensity lamp 40 is mounted at the other end of the hollow shaft 38 and is so positioned so that its filament 42 is as near as possible to the center of the earth-globe 12.

An opaque sphere 44, preferably of plastic, is fixedly secured to shaft 38 by a collar 46 located approximately half way between lamp 40 and the meridian arc 14. This collar supports the plastic sphere 44 in such a manner that it is concentric with the earth-globe 12. The sphere 44 has been charted and has perforations 48 therein in order to represent the relative position of the stars in the heavens. The sphere 44 is also constructed of two hemispheres 50 and 52 separating the sphere 44 at its simulated celestial equator. In this manner light from lamp 40 will escape through the perforations 48 in the sphere 44 and project the star images to the translucent globe surface 12. At the south pole 54 of the sphere 44 is an aperture 56, scaled to admit light in a size simulating the moon. The escaping light 58 from lamp 40 reflects off a reflector mechanism 32. The reflector mechanism 32 is made up of any suitable reflector, such as mirror 60 mounted on a moon drive motor 62 fixedly secured to the shaft 38 by any suitable mounting means, such as bracket 64. The reflected light 86 off mirror 60 ends up as a moon image 68 on the earth-globe 12 at approximately its celestial equator. The moon drive motor 62 is pulsed by the same timing power supply circuit 19 as the earth drive motor 34 and is best shown in FIG. 2 of the drawing. Each motor 34 and 62, however, will be operated at its own rate of speed.

It is therefore possible to project the lighted star images on the translucent globe surface 12 as the globe rotates once per day. A moon image 68 is also projected to the same moving surface 12 and covers one revolution in about 27 and 1/3 days. The power supply and timing system shown in FIG. 2 operates the motors 34 and 62 and is also capable for rapid slewing and faster than normal operating speed when desired.

Although this invention has been described with reference to a particular embodiment it will be understood to those skilled in the art that this invention is also capable of a variety of alternate embodiments within the spirit and scope of the appended claims.

I claim:

1. A self-contained planetarium comprising a hollow translucent globe having indicia thereon simulating a planet, means for rotatably supporting said globe about its axis, said globe axis simulating the axis of rotation of said planet, means for rotating said globe, a projector mechanism mounted within said globe, said projector mechanism having a light source and a hollow opaque sphere fixedly secured to said globe support means, said hollow sphere encasing said light source and located within said globe, said hollow sphere further having perforations therein arranged to simulate the stars in the sky and an aperture at the bottom thereof, a reflector mechanism fixedly mounted to said globe support means and located within said globe, said reflector mechanism having a rotating reflector in optical alignment with a beam of light emanating from said light source and escaping from said aperture in said sphere, and a drive means for rotating said reflector at a predetermined rate of speed, whereby said beam of light reflected off said reflector projects onto said globe simulating the movement of a satellite around said globe.

2. A self-contained planetarium as defined in claim 1 wherein said means for rotating said globe is in the form of a stepper motor in conjunction with a drive means.

3. A self-contained planetarium as defined in claim 2 wherein said means for supporting said globe comprises an arc-shaped member and a globe bearing disk immovably secured to said arc-shaped member, said globe resting upon said bearing disk for rotational movement about its axis.

4. A self-contained planetarium as defined in claim 3 wherein said projector mechanism further comprises a hollow shaft aligned with said globe axis and being fixedly secured at one end to said arc-shaped member and at the other end to said light source.

5. A self-contained planetarium as defined in claim 4 wherein said drive means for rotating said reflector is fixedly secured to said hollow shaft.

6. A self-contained planetarium as defined in claim 5 wherein said hollow sphere is fixedly secured to said hollow shaft.

References Cited

UNITED STATES PATENTS

| 2,496,827 | 2/1950 | Tellier | 35—46 R |
| 3,074,183 | 1/1963 | Frank | 35—42.5 X |
| 2,492,785 | 1/1949 | Concordet | 35—46 R |
| 3,370,415 | 2/1968 | McIlvaine | 35—46 R X |

FOREIGN PATENTS

| 745,762 | 11/1966 | Canada | 35—46 R |

JEROME SCHNALL, Primary Examiner

U.S. Cl. X.R.

35—46 R